United States Patent [19]

Takeishi

[11] 4,082,163
[45] Apr. 4, 1978

[54] OIL REPLENISHING CARTRIDGE

[76] Inventor: Norikazu Takeishi, 453, Nanjo, Nirayama-cho, Tagata-gun, Shizuoka-ken, Japan

[21] Appl. No.: 753,174

[22] Filed: Dec. 22, 1976

[51] Int. Cl.² .......................................... F01M 11/06
[52] U.S. Cl. ................................ 184/105 R; 137/454; 251/144; 222/510
[58] Field of Search ................ 184/103 R, 105 R, 84, 184/96, 74, 75; 222/457, 510; 141/363, 364, 365, 366, 367; 251/144; 137/454

[56] References Cited

U.S. PATENT DOCUMENTS

| 1,401,836 | 12/1921 | Van Orsdale | 184/103 R |
| 2,543,724 | 2/1951 | Iwanowski | 141/363 X |
| 2,565,010 | 8/1951 | Warner | 137/454 X |
| 2,582,901 | 1/1952 | Doyle | 184/103 R X |
| 2,979,161 | 4/1961 | Lyden | 184/103 R |
| 3,570,629 | 3/1971 | Dahm et al. | 184/103 A |
| 3,590,857 | 7/1971 | Gruett | 184/103 R X |
| 3,609,975 | 10/1971 | Lewis et al. | 222/510 X |

FOREIGN PATENT DOCUMENTS

| 62,461 | 1/1955 | France | 184/103 R |
| 209,003 | 3/1940 | Switzerland | 184/84 |

Primary Examiner—David H. Brown
Attorney, Agent, or Firm—Marshall & Yeasting

[57] ABSTRACT

This invention relates to an oil replenishing cartridge which is adapted for use in the air-eliminating operation from automobile hydraulic systems such as hydraulic brake or hydraulic clutch with one operator, and which is capable, upon being simply placed on a reserve tank for said hydraulic system, of automatically replenishing oil to a given level in said reserve tank.

4 Claims, 4 Drawing Figures

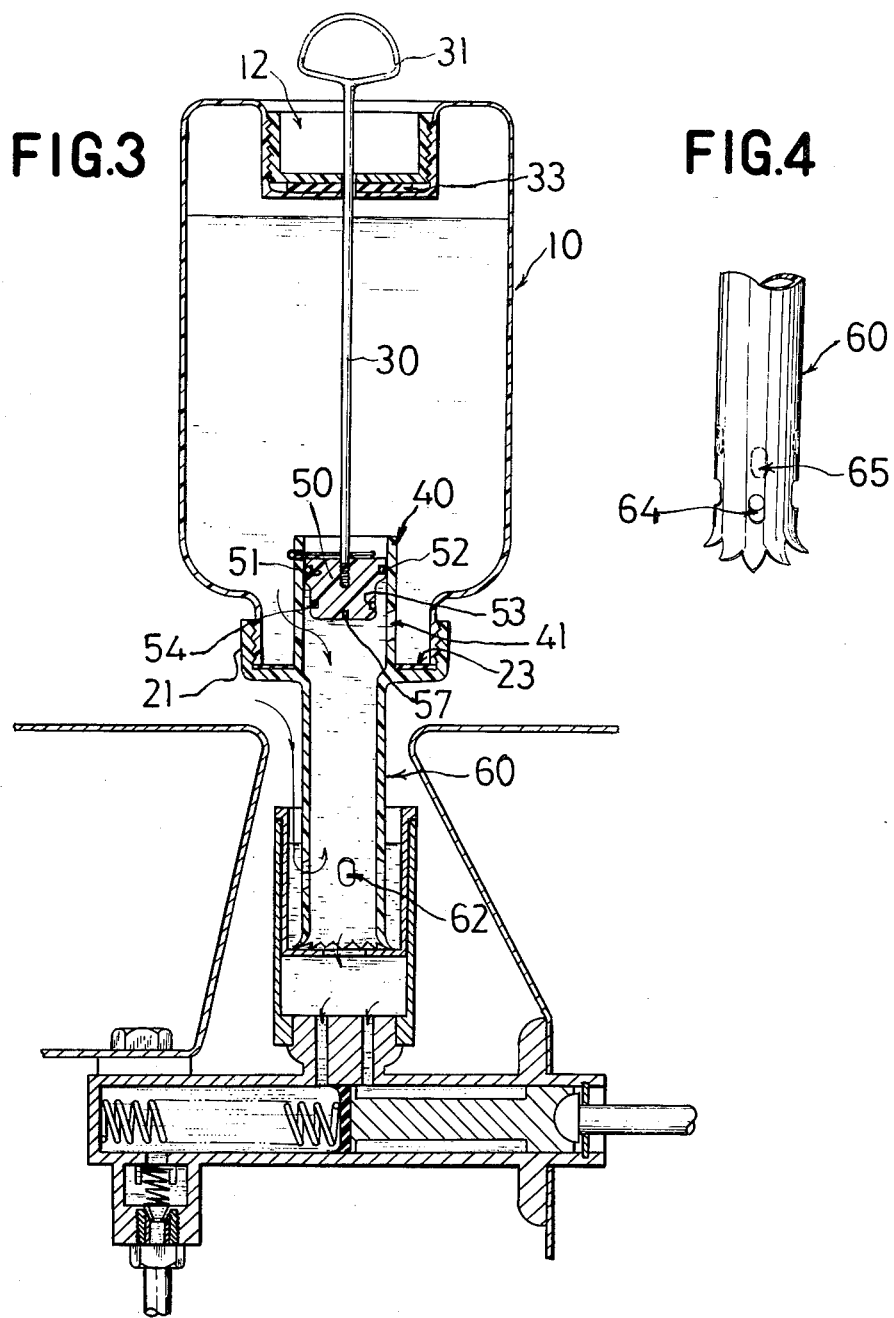

600

OIL REPLENISHING CARTRIDGE

BACKGROUND OF THE INVENTION

The air elimination and oil exchange of hydraulic brake or hydraulic clutch system are important operations in the maintenance of an automobile, which have necessitated two or three persons if such operations are to be conducted manually. For example, the air elimination or oil exchange for a hydraulic brake system has required a person for actuating the push rod of the master cylinder by pressing the brake pedal, an another person for replenishing oil to a reserve tank attached to the master cylinder, and a still another person for operating air nipple provided on each wheel cylinder. In order to enable a single operator to perform such air elimination or oil exchange of the hydraulic brake system or hydraulic clutch system, therefore, there has been proposed a servicing machine comprising an oil replenisher mounted on the reserve tank of the hydraulic system for automatic oil replenishing to a given level, said reserve tank being connected to a master cylinder operated by an operator, check valves mounted on the air nipples provided on the oil cylinders connected to said master cylinder, said check valves allowing the oil to flow only in one direction thereby releasing the oil to outside while said air nipples being maintained open, and a receive tank connected with said check valves to receive the oil exhausted from the oil cylinder through said check valves. Such machine has however encountered difficulties that the oil replenisher is difficult to mount on the reserve tank or the oil control valve of said oil replenisher is difficult to manipulate even if the mounting is possible due to a fact that the reserve tanks of hydraulic brake or hydraulic clutch systems in an automobile are usually located in a place highly crowded with other devices.

SUMMARY OF THE INVENTION

The object of the present invention is to provide an oil replenishing cartridge containing an oil adapted for use in the air elimination or oil exchange of hydraulic systems such as hydraulic brake system or hydraulic clutch system of an automobile and enabling an easy mounting on the reserve tank of said systems at the operations of air elimination or oil exchange of such systems with a single operator.

An another object of the present invention is to provide an oil replenishing cartridge of a simple structure capable of supplying an oil automatically to a determined level in the reserve tank at the air elimination or oil exchange of hydraulic systems, such as hydraulic brake system or hydraulic clutch system, of an automobile.

A still another object of the present invention is to provide an oil replenishing cartridge provided with a valve operating mechanism enabling to manipulate the valve mechanism of said cartridge from the top thereof in order to facilitate the operation of said cartridge when it is mounted on the reserve tank at the air elimination or oil exchange of hydraulic systems such as hydraulic brake system or hydraulic clutch system of an automobile.

The present invention will be explained in detail, while referring to the attached drawings.

EXPLANATION OF DRAWINGS

FIG. 3 is a cross-sectional view illustrating a state wherein the oil replenishing cartridge of the present invention is mounted on a reserve tank for hydraulic brake or clutch system of an automobile; and FIG. 4 is a drawing illustrating an another embodiment of air intake hole provided on the outer tube of the oil replenishing cartridge.

DETAILED DESCRIPTION OF THE PREFERRED EMBODIMENTS

Figure 1:
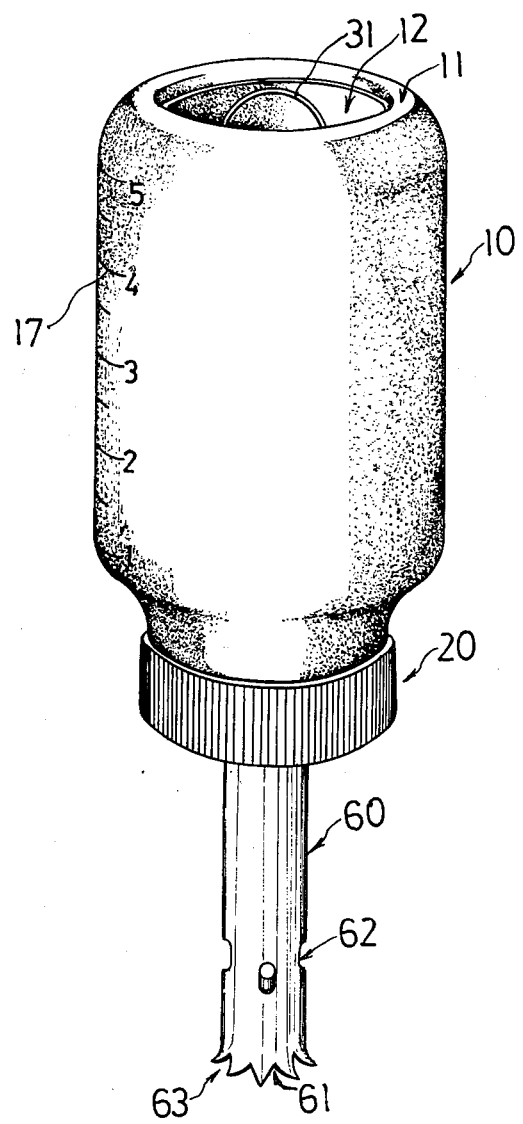
FIG. 1 is a perspective view of the oil replenishing cartridge of the present invention.
Figure 2:
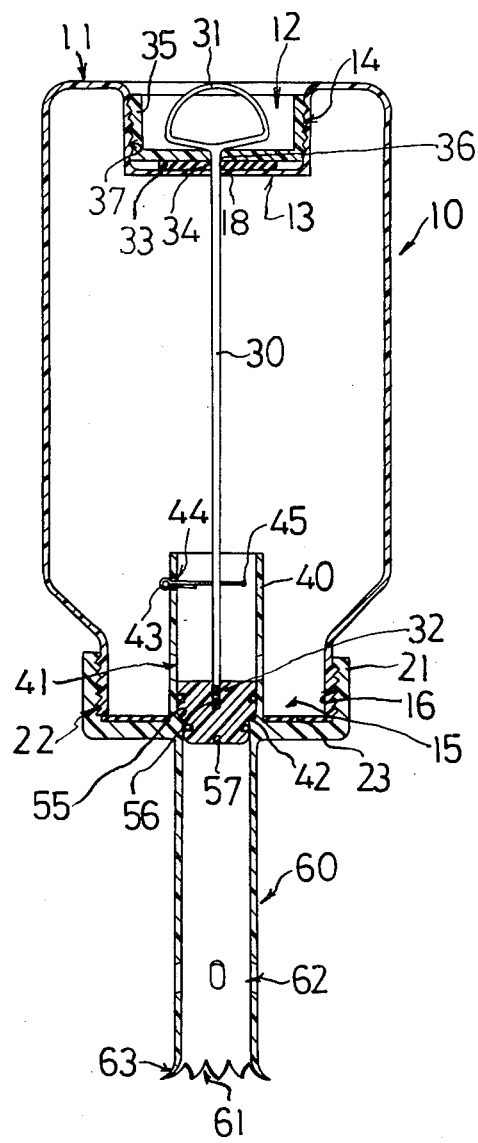
FIG. 2 is a cross-sectional view of the oil replenishing cartridge of the presention.

Now referring to the attached drawings, the container of the oil replenishing cartridge is composed of a container body 10 and a cover 20.

The container body 10 is a container of a volume of 1 or 0.5 liters made of semi-transparent polyester provided on the side wall thereof with graduations 17 for measuring the amount of oil and thus facilitating to indentify the amount of oil used. In the center of the top portion 11 of said container 10 there is provided a recess 12 for accomodating a handle 31 of the valve handling mechanism. In the center of the bottom 13 of said recess 12 there is provided a hole 18 for passing an operating rod 30 connected to said handle 31 to cause sliding motion of a valve body 50 of the valve mechanism. Further said recess 12 is provided, on the lateral periphery thereof, with a female screw 14 which engages with a packing cover 35 for pressing down a packing 33 provided for preventing the leakage of oil through said hole 18. The container body 10 is provided, at the lower part thereof, with an opening 15 provided, on the external periphery thereof, with a male screw 16 engaging with a cover 20.

Said cover 20 is mounted on said opening 15 of the container body 10 to seal the oil contained therein, and, for this purpose, is provided, at the inner periphery of the wall portion 21 vertically extended from the circumference of said cover 20, with a female screw 22 which engages with said male screw 16 of opening 15 to firmly affix said cover 20 on said opening 15. In order to prevent the leakage of oil from the engaging portion of said opening 15 and the cover 20 there is provided an oil-resistant packing 23 which is supported between the lower end of said opening 15 and the bottom wall of cover portion 42.

The valve mechanism is provided in order to control the flow of oil into the reserve tank of hydraulic system, such as hydraulic brake or clutch system, and is composed of an inner tube 40 and a valve body 50. Said inner tube 40 extends vertically from the internal center of said cover 20 and communicates with an outer tube 60 of a somewhat smaller diameter extending vertically from the external center of said cover 20, said inner and outer tubes constituting, at the junction thereof, a tapered valve seat 42. Said inner tube 40 is provided, on the wall thereof, with opening or openings 41 for supplying the oil in said container into the reserve tank of hydraulic systems. The valve body 50 provided in said tube is composed of an upper portion slidably engaging with said inner tube 40, a lower portion engaging with said outer tube 60 and a tapered portion in the middle to engage with said valve seat 42. Said upper portion is provided with an annular groove 51 accomodating an O-ring to ensure liquid-tight sealing between the inner tube 40 and the valve body 50, while said lower portion is also provided with an annular groove 53 accomodating an O-ring 54 to ensure snug fitting with the outer tube 60. In order to limit the stroke of the valve body 50 in the inner tube 40 a split pin 43 is inserted through a hole 44 provided at the upper end of said inner tube 40 into other holes 45, 45 triangularly. In this manner said split pin 43 does not interfere with the vertically movement of operating rod 30 in the inner tube 40 and at the same time performs the function of limiting the stroke of said valve body 50 when it is pulled upwards by the operating rod 30. The valve body 50 is provided, on the upper surface thereof, with a female screw 56 for connection with the operating rod 30, and, on the lower surface thereof, with a V-sectioned groove 56 to be utilized for screwing said operating rod 30 into said valve body 50.

Now an explanation will be given on the valve operating mechanism which enables to operate the valve body 50 mounted slidably in said inner tube 40 from the outside of cartridge. In the center of the recess 12 of the container body 10 there is provided the hole 18 for passing the operating rod 30 for manipulating said valve body 50. In order to prevent eventual leakage of oil through the engaging portion of said hole 18 and the operating rod 30, there is provided an oil-resistant packing 33 with a central hole 34 which is placed on the bottom wall 13 of said recess 12 and maintained in place by a packing cover 35. Said packing cover is of a cylindrical form with closed lower end provided with a male screw 37 on the cylindrical wall to engage with the female screw 14 of said recess 12 and a hole 36 in the center of closed lower end to pass said operating rod 30, and is screwed into said female screw 14 to maintain said oil-resistant packing 33 in compressed state. The operating rod 30 is provided with a ring-shaped handle 31 at the upper end thereof, passes through the holes 18, 34, 36 provided at the bottom of recess 12 of the container body 10, and screwed, by means of a male screw 32 provided at the lower end thereof, into the female screw 56 provided in the upper center of said valve body 50. This screwing can be achieved by fixing the valve body 50 by fitting a screw driver through the outer tube 60 into the V-sectioned groove 57 on the bottom of said valve body 50 and by rotating the operating rod 30. Thus structured, the valve mechanism allows the oil in the cartridge to flow through the opening 41 of the inner tube 40 into the reserve tank when the handle 31 is pulled upwards to displace the valve body 50 upwards in said inner tube 40. Also by pressing down the handle 31, the valve body becomes engaged with the valve seat 42 to interrupt the flow of oil through the opening 41. The handle 31 is accomodated, in the lower position thereof, in the recess 12 so that the cartridge do not have externally protruding portion at the transportation or storage thereof.

The outer tube 60 provided on the external center of the cover 20 in communication with said inner tube 40 constitutes an oil feeding mechanism which renders the cartridge mountable on the reserve tank of hydraulic systems such as hydraulic brake or clutch system of an automobile and performs a function of feeding the oil in the cartridge into said reserve tank automatically up to a determined level when the valve is opened by the valve operating mechanism. Said outer tube 60 is provided, at the lower end thereof, with a tapered supporting portion 63 in order to increase the stability of the cartridge when mounted on said reserve tank, an oil outlet consisting of a V-shaped notch 61 in said support portion 63, and air intake holes 62 on the wall of tube 60 for inhaling air of a volume equal to that of oil supplied from the cartridge into the reserve tank through said notch 61. With the above-explained structure, the cartridge can be mounted on the reserve tank of hydraulic systems by inserting said oil-feeding mechanism into such reserve tank without being affected by the presence of other devices nereby, and the valve mechanism can be manipulated in this state by pulling or pressing the handle 31 provided on the top of said cartridge. In this state, by opening the valve mechanism, the oil contained in the cartridge is supplied to the reserve tank through the opening 41 of said inner tube and the oil outlet of said outer tube 60, and the air of equivalent amount is inhaled through the air intake hole 62 and through the opening 41 of said inner tube 40. The flow of oil is interrupted when the oil level in the reserve tank becomes located above said air intake hole 62 since air is no longer inhaled therethrough into the cartridge. The flow of oil from the cartridge into the reserve tank is started again when the oil level in the reserve tank is lowered by the operation of air elimination or oil exchange to expose the air intake hole 62 above the oil levelthereby enabling air intake therethrough into the cartridge. In this manner the oil feeding is achieved without manpower and controlled by the position of the air intake hole 62.

As a variation of the oil-feeding mechanism, in order to cope wlth various levels in the reserve tank, the outer tube 60 can be provided with plural air intake holes of which lowermost one 64 is realized in a form of penetrating hole while the other holes are realized in a form closed with a thin film which can be easily broken when necessary.

What we claim is:

1. An oil replenishing cartridge comprising a container for oil, a valve in the container controlling the flow of oil therefrom, the valve including a tube, a valve seat at the lower end of the tube and a valve body slidably mounted in the tube, a valve operating mechanism having a lower end connected to the valve body and an upper end extending exteriorly of the container for operating the valve from the outside of the container, and an oil feeding mechanism adapted to be mounted on a reserve tank of a hydraulic system of a motor vehicle, the oil feeding mechanism including a hollow member in communication at its upper end with the valve and provided with an oil outlet at its lower end and an air intake opening between the member ends, the oil feeding mechanism functioning to feed oil through the oil outlet to a level in the reserve tank as determined by the oil level in the reserve tank relative to the air inlet.

2. An oil replenishing cartridge according to claim 1 wherein said container comprises a body provided with a recess on one end and an opening at the other end, and a cover mounted on said opening.

3. An oil replenishing cartridge according to claim 2 wherein an opening is provided in the recess and the valve operating mechanism includes a valve operating rod passing through the hole and provided at its upper end with a handle accomodated in the recess.

4. An oil replenishing cartridge according to claim 2 wherein said valve operating mechanism comprises an oil-resistant packing provided with a hole in the center thereof and placed on the bottom of said recess of container body, and a packing cover provided with a hole in the center thereof and fitted into said recess.

* * * * *